UNITED STATES PATENT OFFICE.

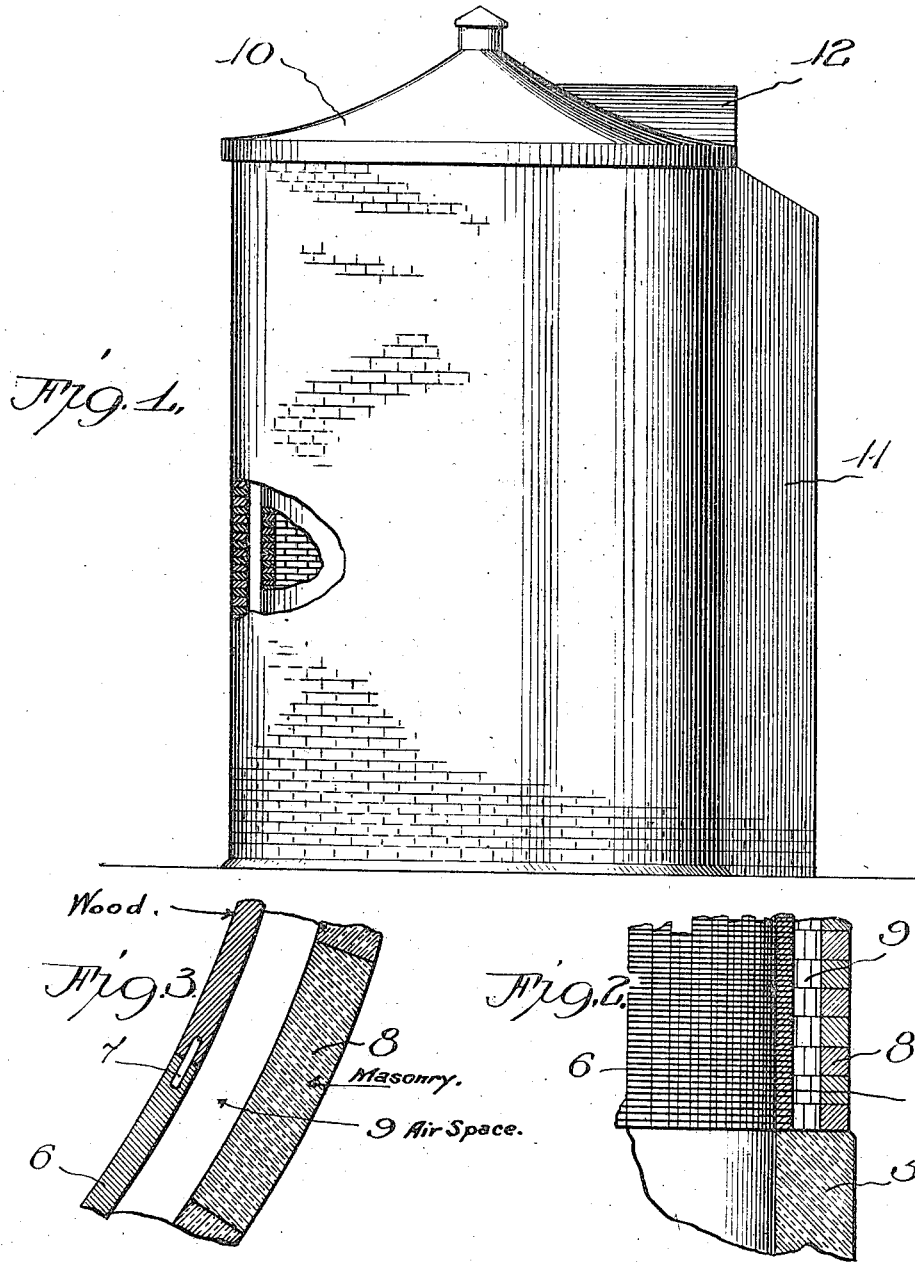

LOU C. YOUNG, OF OSWEGO, ILLINOIS.

SILO.

1,256,089.

Specification of Letters Patent.

Patented Feb. 12, 1918.

Application filed April 22, 1915. Serial No. 22,983.

*To all whom it may concern:*

Be it known that I, LOU C. YOUNG, a citizen of the United States, and a resident of Oswego, county of Kendall, and State of Illinois, have invented certain new and useful Improvements in Silos, of which the following is a specification.

My invention relates to the construction of the walls of a silo, and consists, primarily, in the combining of the walls of the wooden and concrete or brick silo.

It is well known that stave silos have many disadvantages, as wood is not an enduring material, especially when exposed to the atmospheric elements, as its nature is such as to cause it to shrink when dry and to swell or expand when wet. Further, the permanency of a stave silo depends largely upon its maintaining a constant rigidity of structure. A wood stave silo consists primarily, of staves set on end and held firmly in place by hoops, and as long as the hoops remain tight upon the staves the structure will be rigid and stable, but so soon as the hoops become loose, due to shrinkage of the staves, the silo will collapse.

The concrete silo has the inherent disadvantage of being liable to crack and disintegrate, due to sudden contraction and expansion of the material when subjected to changes in temperature. I have found that a silo having a brick wall will partially if not entirely overcome this disadvantage.

Wood is not so greatly affected by heat as cement or brick, and because of this it will require a lower temperature to freeze the ensilage in a wood silo than in a brick or cement.

It is, therefore, my object to provide a silo that combines the advantages of both the wood silo and the brick or cement silo, at the same time eliminating many disadvantages incident to each.

I am fully aware, however, that double walled structures have been heretofore provided so as to form an air chamber intermediate the walls, but so far as I am aware, this air chamber has been limited in its extent, being usually confined to small areas. Therefore, the essential object of my invention is to provide a silo with a novel double wall whereby it will contain a continuous air chamber that is unobstructed and extends from the bottom to the top thereof.

In the drawings:

Figure 1 is an elevation of a silo embodying my invention.

Fig. 2 is a detail vertical section.

Fig. 3 is a detail horizontal section.

In carrying out my invention I preferably construct the usual form of a cement casement, or foundation, 5, which it is the custom to provide for silos as their support. Upon the top and adjacent the inner periphery of this foundation, 5, I erect an inner wall consisting of a plurality of superimposed layers of segmental shaped wooden strips, 6, their abutting ends being preferably secured to each other by a metal spline or dowel, 7. Each respective layer or layers is suitably spiked or bolted to its adjacent layer, thus eliminating the necessity of hoops or bands as in the case of a vertical stave silo. Concentrically around this inner wooden wall, and upon the base, 5, I erect an outer brick wall, 8, that is spaced from the inner wall, 6, a distance corresponding substantially with the thickness of the masonry wall, thereby providing a concentric air chamber, 9, intermediate the walls. These inner and outer walls are unconnected with each other and, therefore, the air space forms an insulation between the same preventing the heat or cold of the masonry outer wall being conducted to the inner wall, and thereby to the ensilage.

The inner and outer walls are built to any desired height where they terminate in a horizontal plane and any well-known form of silo roof, 10, is built over the structure. I also find it desirable to provide a chute, 11, upon the exterior of the outer wall, 8, down through which the ensilage may be distributed, and I also provide a cupola, 12, in the roof through which the silo is filled.

While I have herein illustrated and described certain specific means and methods of carrying out my invention, it, of course, will be obvious to those skilled in the art, that divers modifications and refinements thereof are possible without materially departing from the spirit of my invention. I, therefore, desire it understood that all such changes are contemplated within the scope of my invention and as are expressed in the appended claims.

Having thus described my invention what I claim as new is:

1. A silo comprising an inner wall consisting of segmental blocks of wood disposed in layers or courses adjacent blocks being secured end to end and side to side, the blocks of said wooden wall being adapted to swell by the action of the moisture from the silage and seal the junctures between adjacent blocks against the passage of air, and an outer wall spaced from and unconnected with said inner wall and adapted to protect the said inner wall from changes of temperature and moisture and prevent evaporation therefrom.

2. A silo comprising an inner wall consisting of segmental blocks of wood disposed in layers or courses adjacent blocks being secured end to end and side to side, the blocks of said wooden wall being adapted to swell by the action of the moisture from the silage and seal the junctures between adjacent blocks against the passage of air, and an outer wall of masonry spaced from and unconnected with said inner wall and adapted to protect the said inner wall from changes of temperature and moisture and prevent evaporation therefrom.

Signed at Oswego, Kendall county, Illinois, this 14 day of April, 1915.

LOU C. YOUNG.

Witnesses:
CHARLES SHOGER,
A. H. KORTE.

Copies of this patent may be obtained for five cents each, by addressing the "Commissioner of Patents, Washington, D. C."